(12) United States Patent
Numano (10) Patent No.: US 7,142,418 B2
(45) Date of Patent: Nov. 28, 2006

(54) INFORMATION PROCESSING APPARATUS AND REMOTE OPERATION METHOD OF THE INFORMATION PROCESSING APPARATUS

(75) Inventor: Fujihito Numano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 10/700,668

(22) Filed: Nov. 5, 2003

(65) Prior Publication Data

US 2004/0093447 A1  May 13, 2004

(30) Foreign Application Priority Data

Nov. 6, 2002  (JP) .............................. 2002-322840

(51) Int. Cl.
*G06F 1/16* (2006.01)
*A47G 5/00* (2006.01)

(52) U.S. Cl. ...................... 361/684; 345/168; 715/512

(58) Field of Classification Search ........ 361/679–687, 361/724–727, 699, 709–711; 174/15.1; 165/80.4, 165/104.33; 358/342; 711/164; 345/168, 345/156; 715/512; 713/1
See application file for complete search history.

(56) References Cited

U.S. PATENT DOCUMENTS

| | | | | |
|---|---|---|---|---|
| 5,309,249 A | * | 5/1994 | Ishii ........................... | 386/105 |
| 5,781,177 A | * | 7/1998 | Helot et al. ................. | 345/156 |
| 5,956,194 A | * | 9/1999 | Ohmi et al. .................. | 360/60 |
| 6,504,529 B1 | * | 1/2003 | Inagaki et al. ............. | 345/168 |
| 6,809,927 B1 | * | 10/2004 | Ohashi et al. .............. | 361/699 |
| 2003/0188144 A1 | * | 10/2003 | Du et al. ....................... | 713/1 |
| 2005/0172218 A1 | * | 8/2005 | Nishimura et al. ......... | 715/512 |

FOREIGN PATENT DOCUMENTS

| | | |
|---|---|---|
| JP | 06-070596 | 3/1994 |
| JP | 7-20792 | 1/1995 |
| JP | 10-222245 | 8/1998 |
| JP | 2002-234399 | 8/2002 |
| JP | 2002-291057 | 10/2002 |
| WO | WO 02/065263 A1 | 8/2002 |

* cited by examiner

*Primary Examiner*—Hung Van Duong
(74) *Attorney, Agent, or Firm*—Finnegan, Henderson, Farabow, Garrett & Dunner, L.L.P.

(57) ABSTRACT

An information processing device has an openable display case provided on a main body of the information processing apparatus, a driver which opens or closes the display case on the main body, and a unit for remotely controlling driving mechanism.

5 Claims, 9 Drawing Sheets

INFORMATION PROCESSING APPARATUS AND REMOTE OPERATION METHOD OF THE INFORMATION PROCESSING APPARATUS

CROSS-REFERENCE TO RELATED APPLICATIONS

This application is based upon and claims the benefit of priority from the prior Japanese Patent Application No. 2002-322840, filed Nov. 6, 2002, the entire contents of which are incorporated herein by reference.

BACKGROUND OF THE INVENTION

1. Field of the Invention

The present invention relates to an information processing apparatus having an openable display case provided on a main body thereof, and a remote operation method of the apparatus.

2. Description of the Related Art

Conventionally, in an information processing apparatus such as a portable personal computer, for example, having an openable display case provided on a main body thereof, the display case has been opened or closed every time a user uses the apparatus. As a technique for electrically driving the opening or closing of the display case, there exists a display mechanism having operating buttons for opening and closing operations provided on the main body of the apparatus (refer to FIG. 1 of Jpn. Pat. Appln. KOKAI Publication No. 7-20792, for example).

However, in any case of automatic and manual operations, opening and closing operations must be carried out by directly operating the main body of the apparatus in the vicinity of the apparatus, and the display case has been opened or closed by intervening a human being in the same manner.

As described above, conventionally, the display case has been opened or closed by intervening a human being in the same manner.

BRIEF SUMMARY OF THE INVENTION

An information processing device according to a first aspect of the present invention is characterized by comprising: an openable display case provided on a main body of the information processing apparatus; a driver which opens or closes the display on the main body; and means for remotely controlling motor. With this configuration, means for controlling the driver, which opens the display case on the main body in a predetermined state in accordance with an operation signal of the means for remotely controlling the driving, is further provided. The means for controlling the driver controls motor based on an operation signal of the remote operation means.

DETAILED DESCRIPTION OF THE INVENTION

Hereinafter, a preferred embodiment of the present invention will be described with reference to the accompanying drawings.

Figure 1:
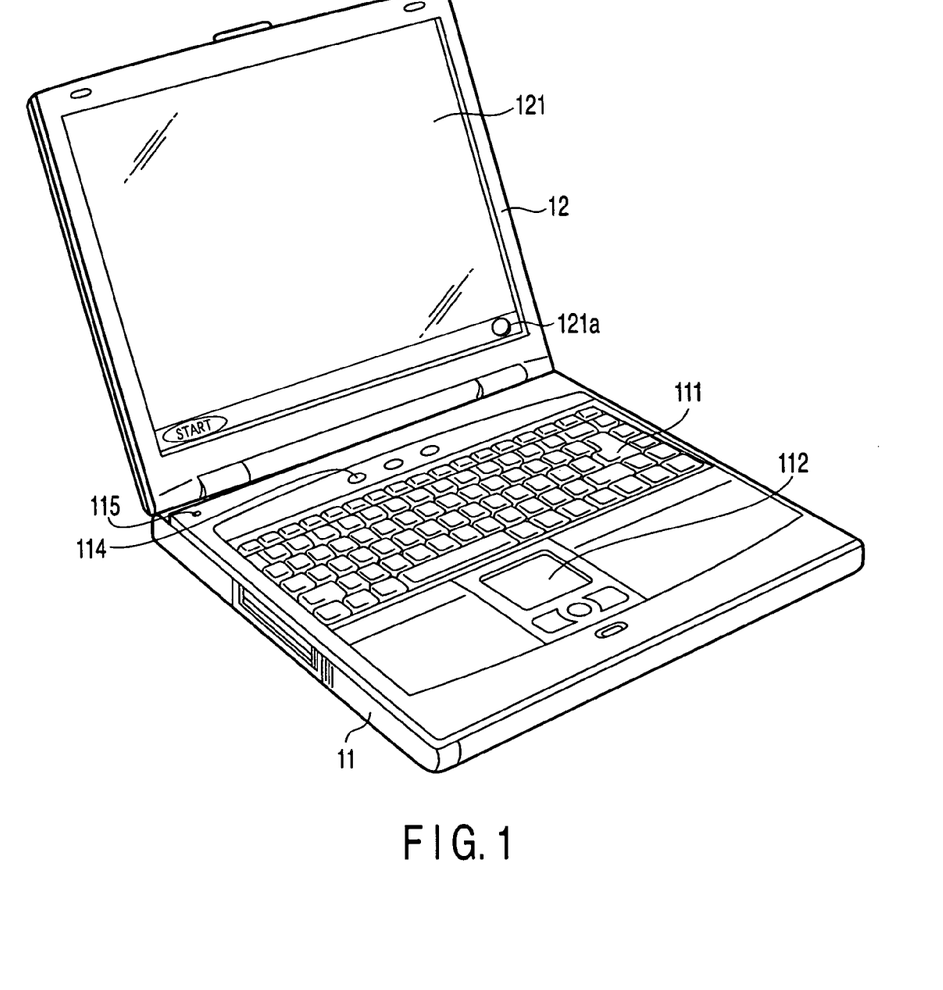
FIG. 1 is a perspective view showing an external configuration of an information processing apparatus according to an embodiment of the present invention.

FIG. 1 is a perspective view showing an external configuration of an information processing apparatus according to an embodiment of the present invention, wherein a notebook type personal computer is illustrated.

Figure 2:
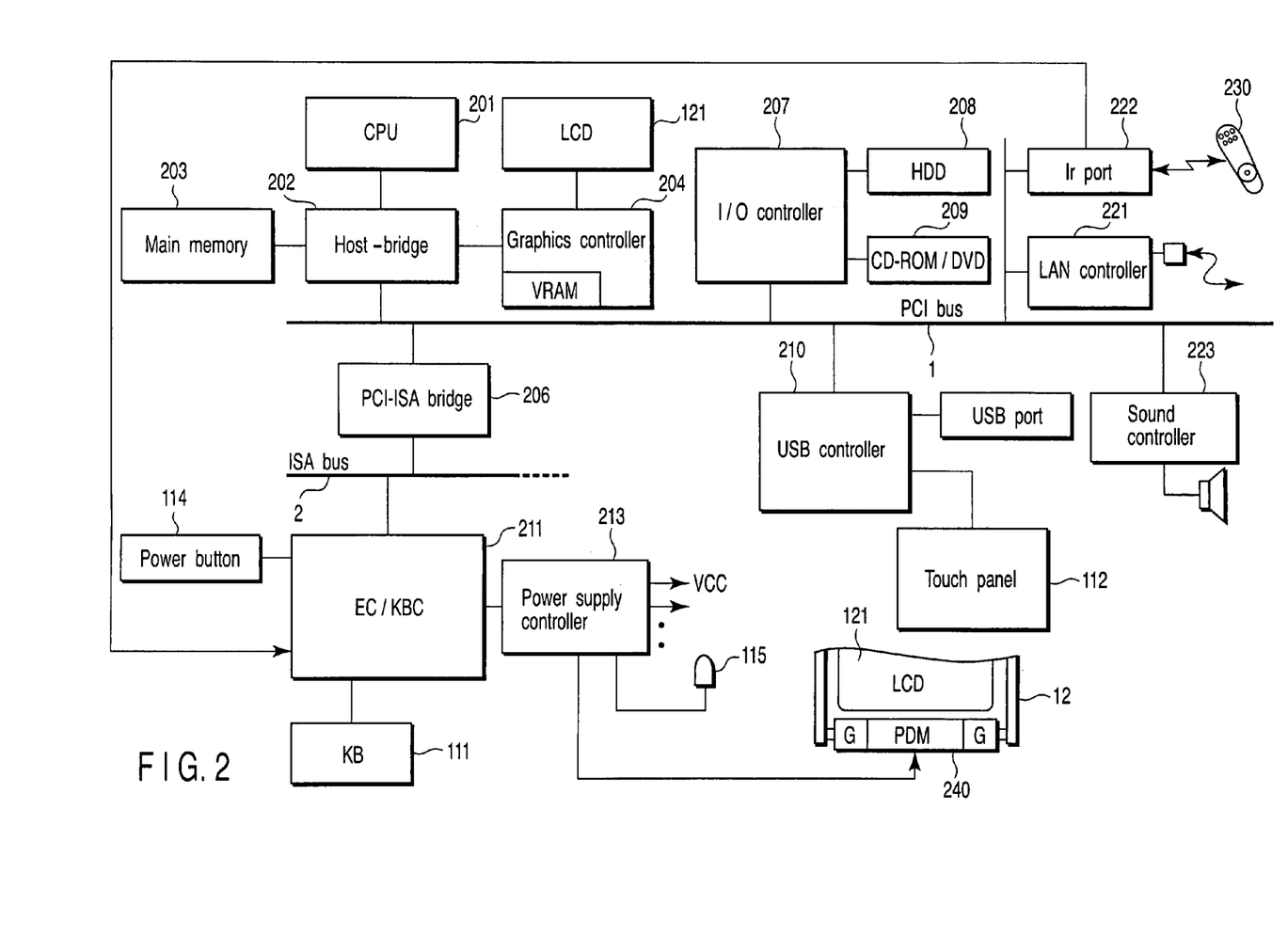
FIG. 2 is a block diagram depicting the system configuration according to the embodiment of the present invention.

The computer according to the embodiment of the present invention shown in FIG. 1 has a computer main body 11 and a display unit (display case) 12. A main display device (main display) 121 having an LCD is incorporated in the display unit 12. The display unit 12 is mounted turnably between an open position and a closed position relevant to the computer main body 11. The computer main body 11 has a thin-box-shaped case. A power button 114 for turning ON/OFF a power supply of the computer main body 11, a keyboard 111 and the like are allocated on the top face of the case, and an arm rest is formed on the top face of the case portion in front of the keyboard 111. A touch panel 112 is provided at a substantial center of the arm rest. In addition, at the inside of the computer main body 11, a panel open/close driving motor (PDM) 240 for driving the opening and closing of the display unit 12, and a drive transmission mechanism (G) are provided as shown in FIG. 2. Lid switch 115, which detects the open or close status of the display unit 12 is further provided on the case. The open/close status may be detected by, for example, a rotary switch installed in the driving mechanism of the panel described later, not by use of the lid switch 115.

FIG. 2 is a block diagram depicting the system configuration of the computer shown in FIG. 1. The computer, as illustrated, has a CPU 20, a host bridge 202, a main memory 203, a graphics controller 204, a PCI-ISA bridge 206, an I/O controller 207, a hard disk drive (HDD) 208, a CD-ROM/DVD drive 209, a USB controller 210, a LAN controller 221, a infrared-ray port (Ir port) 222, a sound controller 223, an embedded controller/keyboard controller IC (EC/KBC) 211, a power controller 203 and the like.

The CPU 201 controls a computer operation. Specifically, the CPU 201 execute a variety of processings in accordance with an operating system (OS) and an application program or a utility drive which are loaded from the hard disk drive (HDD) 208 onto the main memory 203. In the present embodiment, in accordance with startup of the operating system (OS), information exchange for driving the panel open/close driving motor (PDM) 240 is carried out with EC and KBC 211 via bridges 202 and 206.

The host bridge 202 is a bridge device which establishes connection between a local bus of the CPU 201 and a PCI bus 1 bi-directionally. The graphics controller 204 has a video RAM (VRAM), and controls the main display 121 used as a display monitor of the computer under the control of a dedicated display driver. The main display 121 performs a predetermined display, and, for example, the start button and a remote control tray button 121a, which is described later in detail, are displayed thereon. The I/O controller 207 controls the hard disk drive (HDD) 208, CD-ROM/DVD drive 209 and the like. The PCI-ISA bridge 206 is a bridge device which bi-directionally connects the PCI bus 1 and the ISA bus 2 to each other. The PCI-ISA bridge 206 incorporates a variety of system devices such as a system timer, a DMA controller, and an interruption controller, for example.

The Ir port 222 is in an always operable state irrespective of whether the apparatus is powered ON/OFF. Having received a infrared-ray signal outputted from the remote controller 230, the Ir port 222 converts this received signal into a command handled by the system, and outputs the converted command onto the PCI bus 1. When the power supply is in off state, the signal inputs to the EC/KBC211 directly.

The EC/KBC 211 has a one-chip microcomputer integrated therewith the embedded controller (EC) for power control, the keyboard controller (KBC) for controlling the keyboard 111 and the like.

The EC/KBC 211 and Ir port 222 are in an always operable state, which receives a command, irrespective of whether the apparatus (this computer) is powered ON/OFF. The EC/KBC 211 controls the power controller 213, and supplies/shutting off a power supply for operation relevant to each component in the apparatus according to an operation of the power button 114. Further, in the present embodiment, after the Ir port 222 has received the infrared-ray signal delivered from the remote controller 230, when the received signal is converted into a command, and the converted command is outputted onto the PCI bus 1, the EC/KBC 211 receives the command, and carries out instruction control in accordance with the command. For example, having received a power ON instruction command from the Ir port 222 via the PCI bus 1, for example, the EC/KBC 211 controls the power supply for operation to be supplied to each component in the apparatus in cooperation with the power controller 213. At this time, in the present embodiment, a panel open/close driving motor (PDM) 240 is controlled to be driven under the control of the EC/KBC 211. By driving the panel open/close driving motor (PDM) 240, the display unit 12 having the main display (LCD panel) 121 stored therein is driven to be opened or closed on the computer main body 11.

The panel open/close driving motor 240 receives a power supply for operation from the power controller 213 under the control of the EC/KBC 211, and drives the display unit 12 to be opened/closed on the computer main body 11 having the keyboard 111 provided thereon. At this time, a deceleration mechanism using a geared belt, or a drive transmission mechanism such as a driving motor incorporating a deceleration gear can be applied as the drive transmission mechanism (G) for transmitting a drive torque of the panel open/close driving motor (PDM) 240 to the display unit 12. Also, in the present embodiment, the display unit 12 is structurally driven to be opened/closed on the computer main body 11 having the keyboard 111 provided thereon. However, the display unit 12 can be structurally driven to be only open or close by means of the motor, for example.

Figures 5A, 5B:
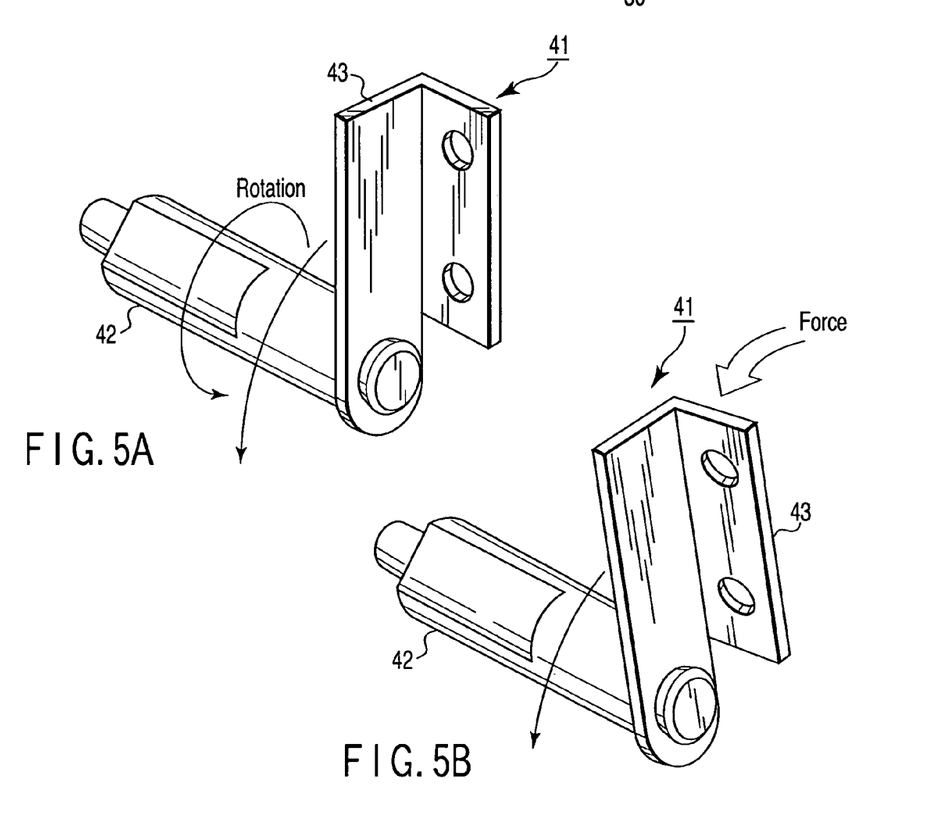
FIG. 5A and FIG. 5B are figures showing an opening and closing mechanism of display unit.

Referring to FIG. 5A and FIG. 5B, the open/close mechanism of the display unit 12 will be explained.

Figure 3:
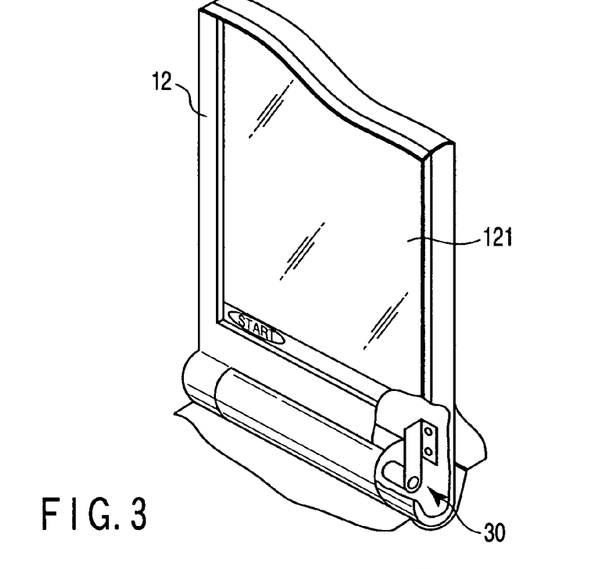
FIG. 3 is a figure showing an opening and closing mechanism of display unit.

The display unit 12 has a main display 121 at a front side thereof as shown in FIG. 3. When the display unit 12 is closed, the main display 121 is opposed to the upper surface of the case. For example, the panel driving mechanism 30 is provided at a lower right edge of the display unit 12. The panel driving mechanism 30 is used to one rotation axis of display unit 12 and automatically opens and closes the display units 12 by the predetermined frictional force.

Figure 4:
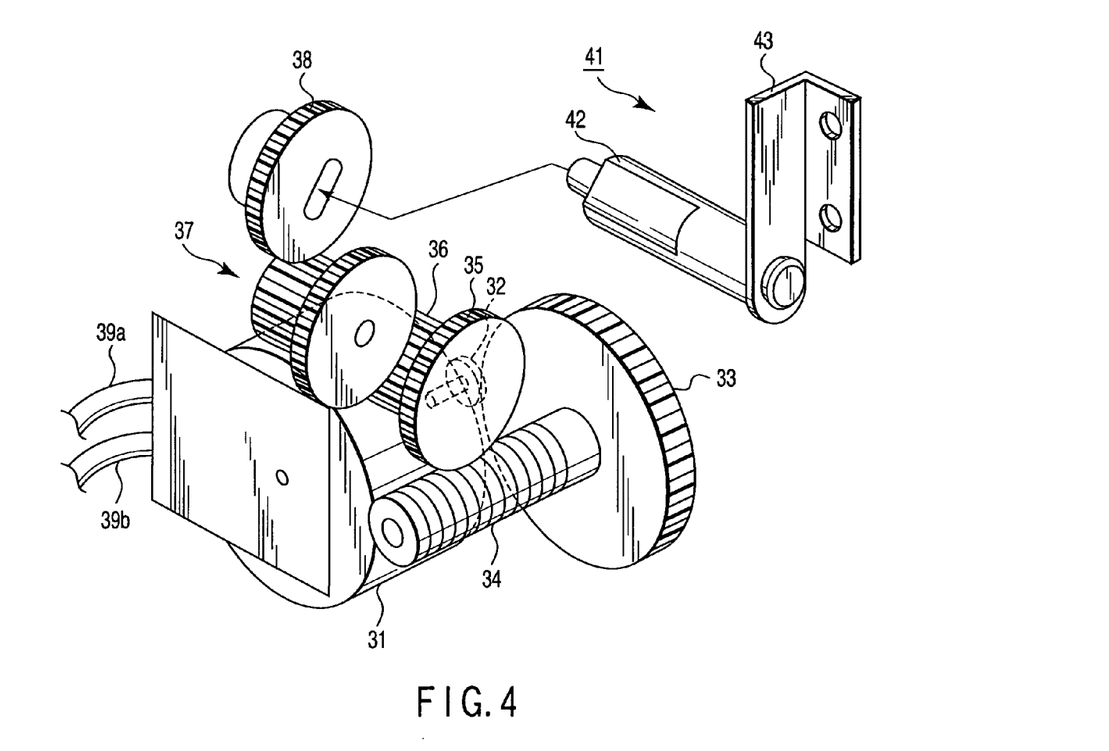
FIG. 4 is a figure showing an opening and closing mechanism of display unit.

The driving mechanism of the panel will be explained referring to FIG. 4. FIG. 4 is an oblique perspective view showing configuration of the panel driving mechanism 30. The panel driving mechanism 30 has driving means and position holding means. The panel driving mechanism 30 has LCD driving motor 31, which configure driving means, a worm gear 34 and a worm wheel 35, etc, and an L-shaped torque hinge etc. used as position holding means. These are is built in the support unit (not shown in the figure) by the following manner and are set in the case to which the right lower edge of the LCD panel is attached.

Stepping motor is used as the LCD driving motor 31 and, the LCD driving motor 31 has, for example, a plus wiring 39a and a minus wiring 39b, connected to the power supply controller. Pinion gear 32 is fixed to the rotation axis of the LCD driving motor 31, and the gear 33 are engaged with the pinion gear 32. The rotation axis of gear 33 and worm gear 34 are shared and are integrated.

The worm wheel 35 is engaged to the worm gear 34. The worm wheel 35 and the gear 36 are integrated by sharing the rotation axis, and the gear 36 is engaged with the gear 38 to rotate rotation axis 42 as a gear to be driven through train of gears 37. A piece of the torque hinge 41 is inserted to the rotation center of the gear 38 to rotate rotation axis 42. With this configuration, the torque hinge 41 is rotated around the inserted piece thereof as a rotation axis by rotating the gear 38 to rotate rotation axis 42 the axis rotation.

The torque hinge 41 has the rotation axis 42 inserted to the gear 38 to rotate rotation axis 42 used as the rotation axis and a slipping plate 43 as the holding part. An end of the rotation axis 42 is inserted rotatably to the hole part of the bearing of the support unit in the case (not shown in the figure). The slipping plate 43 is rotatably attached to the other end of the rotation axis 42 through the wave washer (not shown in the figure). At this time, the rotation axis 42 between the gear 38 to rotate rotation axis 42 and the slipping plate 43 is rotatably supported by the bearing of the support unit (not shown in the figure). The slipping plate 43 is attached to the display unit 12 with a screw (not shown in the figure). The rotation axis 42 is used as a rotation axis when the display unit 12 is opened and closed.

With this configuration, the slipping plate 43 is pressed into the rotation axis 42, and, as a result, a fixed frictional force can be obtained. Therefore, when the torque is gradually given to the torque hinge 41, the rotation axis 42 and the slipping plate 43 are held by the frictional force during the given torque is smaller than the frictional force. The slipping plate 43 becomes rotatable to the rotation axis 42 during the given torque is larger than the frictional force, because the rotation axis 42 and the slipping plate 43 slip. In the embodiment, the slipping plate 43 is pressed into the rotation axis 42 so that frictional force is larger than the torque caused by one's own weight of the display unit 12 when opening and closing the LCD panel. For example, the display unit 12 can be opened and closed on the case within the range of 0 to 120°.

The operation example of the driving mechanism of the panel will be explained referring to FIG. 5A and FIG. 5B.

FIG. 5A and FIG. 5B are figures showing the operation example of driving mechanism 30 of the panel, and are oblique perspective views at automatic open/close operation and at manual open/close operation, respectively.

In a case of opening and closing the display unit 12 automatically, when the LCD driving motor 31 rotates by the open/close control mechanism 80, the gear 33 rotates through the pinion gear 32, and then the worm gear 34 integrated by the gear 33 rotates. And, the worm wheel 35 engage to the worm gear 34 rotates and the gear 38 to rotate rotation axis 42 rotates through train of gears 37, then the rotation axis 42 rotates. At this time, since the rotation axis 42 and the slipping plate 43 are held by the frictional force, the slipping rate 43 is follows to the rotation of the rotation axis 42. The display unit 12 is opened and closed with a predetermined frictional force by the rotation of the torque hinge 41.

Next, in a case of opening and closing the display unit 12 manually, when the LCD drive motor 31 is stopped, the rotation of rotation axis 42 of torque hinge 41 is locked by the engagement of the worm gear 34 and the worm wheel 35. At this time, the display unit 12 is held at a predetermined position by the frictional force generated between the rotation axis 42 and the slipping plate 43. Under such a condition, when a predetermined stress is given to the display unit 12, the slipping is caused between the rotation axis 42 of the torque hinge 41 and the slipping plate 43. As a result, because the display unit 12 can be opened and closed, the opening and closing of display unit 12 and the opening and closing angle can be easily adjusted manually.

Figure 6:
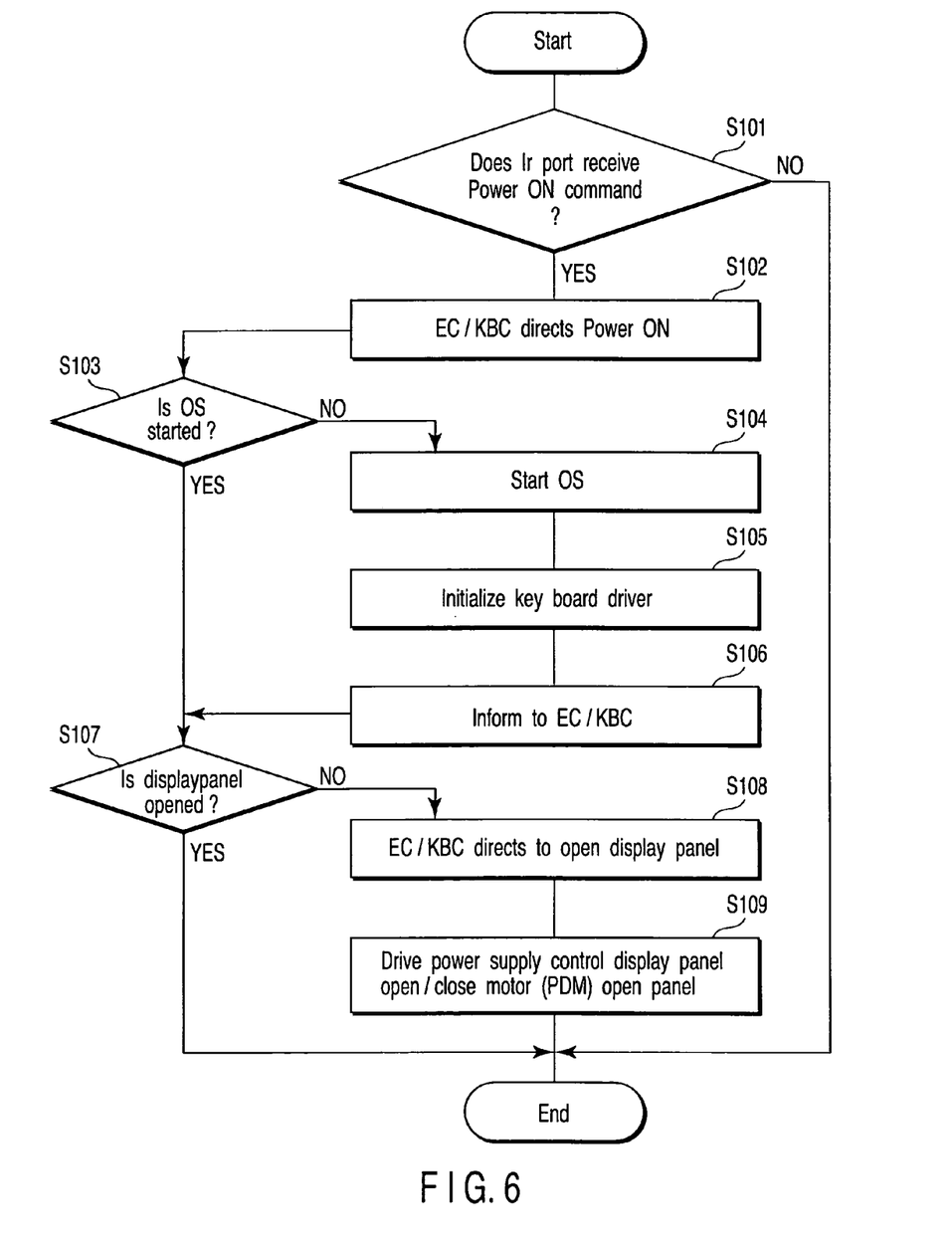
FIG. 6 is a flow chart showing procedure of opening a display unit according to embodiment of present invention.

FIG. 6 is a flow chart showing procedures for processing in accordance with the drive of the display unit 12 to be opened or closed associated with the drive of the panel open/close driving motor (PDM) 240.

When the Ir port 222, which is always in an ON state, receives a infrared-ray signal outputted from the remote controller 230, the Ir port 222 converts the received signal into a command handled by the system, and outputs the converted command onto the PCI bus 1.

After the Ir port 222 has received the infrared-ray signal delivered from the remote controller 230, when the received signal is converted into a command, and the converted command is outputted onto the PCI bus 1, the EC/KBC 211 receives the command, and carries out instruction control in accordance with the received command.

At this time, when the EC/KBC 211 receives a power ON instruction command from the Ir port 222 directly (step S101 in FIG. 6), the EC/KBC 211 instructs the power controller 213 to be powered ON (step S102 in FIG. 6). The EC/KBC 211 detects whether the OS starts (step S103). In step S103, if the OS does not start, when the power controller 213 receives a power ON instruction from the EC/KBC 211, the power controller 213 supplies power supply for operation to each component including the CPU 201 in accordance with a predetermined power supply sequence.

In addition, when the above power is supplied, the EC/KBC 211 starts up an operating system (OS), and starts system startup processing (step S104 in FIG. 6). In step S103, if the OS starts, the procedure advances to step S107.

In an initializing process associated with startup of the operating system (OS), when the EC/KBC 211 checks the end of initialization of a keyboard driver which enables an input operation from the keyboard 111 (steps S105 and S106 in FIG. 6), if the display unit 12 has been closed (YES in step S107), the EC/KBC 211 instructs the power controller 213 to release the display unit 12 (step S108 in FIG. 6). In step S107, if he display unit opens, the procedure ends.

When the power controller 213 receives an instruction for releasing the display unit 12 from the EC/KBC 211, the power controller 213 supplies driving power in the panel release direction to the panel open/close driving motor (PDM) 240 in accordance with such an instruction, and drives the display unit 12 to be released (step S109 in FIG. 6). In this way, the display unit 12 having the main display (LCD panel) 121 stored therein is driven to be released on the computer main body 11 having the keyboard 111 provided thereon.

In this manner, the display unit 12 having the main display (LCD panel) 121 stored therein is automatically released on the computer main body 11 having the keyboard 111 provided thereon, associated with the power ON remote operation of the remote controller 230. Then, key operation on the keyboard 111 is enabled associated with the release of the display unit 12.

The foregoing description has been given with respect to release drive control of the display unit 12 when the system is powered ON associated with the remote operation of the remote controller 230. In a power OFF remote operation of the remote controller 230 as well, the panel open/close driving motor (PDM) 240 receives the drive power in the panel closing direction from the power controller 213 and automatically closes the display unit 12 under the control of EC/KBC 211 in the same manner as that described above. This operation will be explained referring to FIG. 7.

Figure 7:
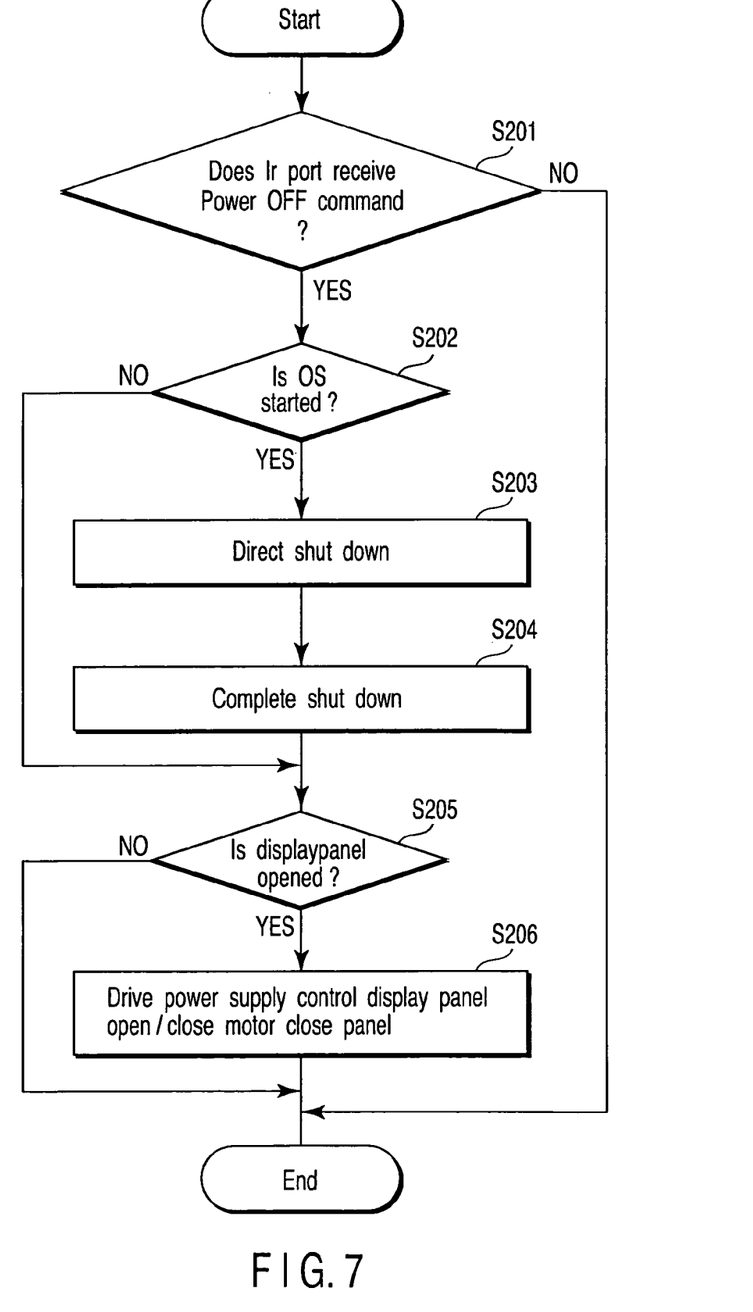
FIG. 7 is a flow chart showing procedure of closing a display unit according to embodiment of present invention.

When the Ir port 222 receives the infrared rays signal output from the remote controller 230, the Ir port 222 converts the reception signal into the command treated in the system and outputs to the PCI bus 1.

When the EC/KBC 211 receives the command of the power off instruction from the Ir port 222 through the PCI bus 1 (YES in step S201 of FIG. 7), the EC/KBC 211 detects whether the OS starts (step S202). The procedure advances to step S205 if the OS does not start in step S202. The EC/KBC 211 directs the shutdown if the OS does not start in step S202 (step S203). If the shutdown is completed (step S204), the EC/KBC 211 detects the open/close status of the display unit 12 (step S205). If the panel closes (NO in step S205), procedure ends. If the panel is open (YES in step S205), the EC/KBC 211 directs close of the display unit to the power supply controller 213. The power supply controller 213 supplies the driving power supply in the close direction of the panel to panel open/close drive motor (PDM) and 240 according to the close instruction from the EC/KBC211 to drives the display unit 12 to the close position (step S206). As a result, the display unit 12 contains the main display 121 (LCD panel) closes on the computer main body 11 having the keyboard 111.

The above-described remote open/close control of the display unit 12 can be also performed in the following cases. For example, (1) When receiving a play instruction or a play termination instruction of the DVD mounted on the CD-ROM/DVD drive 209 from the remote controller, or (2) When receiving an instruction from the LAN controller 221, UBS port or the like.

In this case, the display unit 12 can be opened/closed on the computer main body 11 in accordance with the above instructions irrespective of whether the system is powered ON/OFF, under the control of the above described EC/KBC 211. Since the operation when receiving the instruction from the LAN controller 221 and the USB port, etc. is almost similar to the operation shown in FIG. 6 and FIG. 7, figures and the explanation thereof will be omitted. An operation when receiving a play instruction of the DVD mounted on the CD-ROM/DVD drive 209 from the remote controller and an operation when receiving a play termination instruction thereof will be explained referring to FIG. 8 and FIG. 9, respectively.

Figure 8:
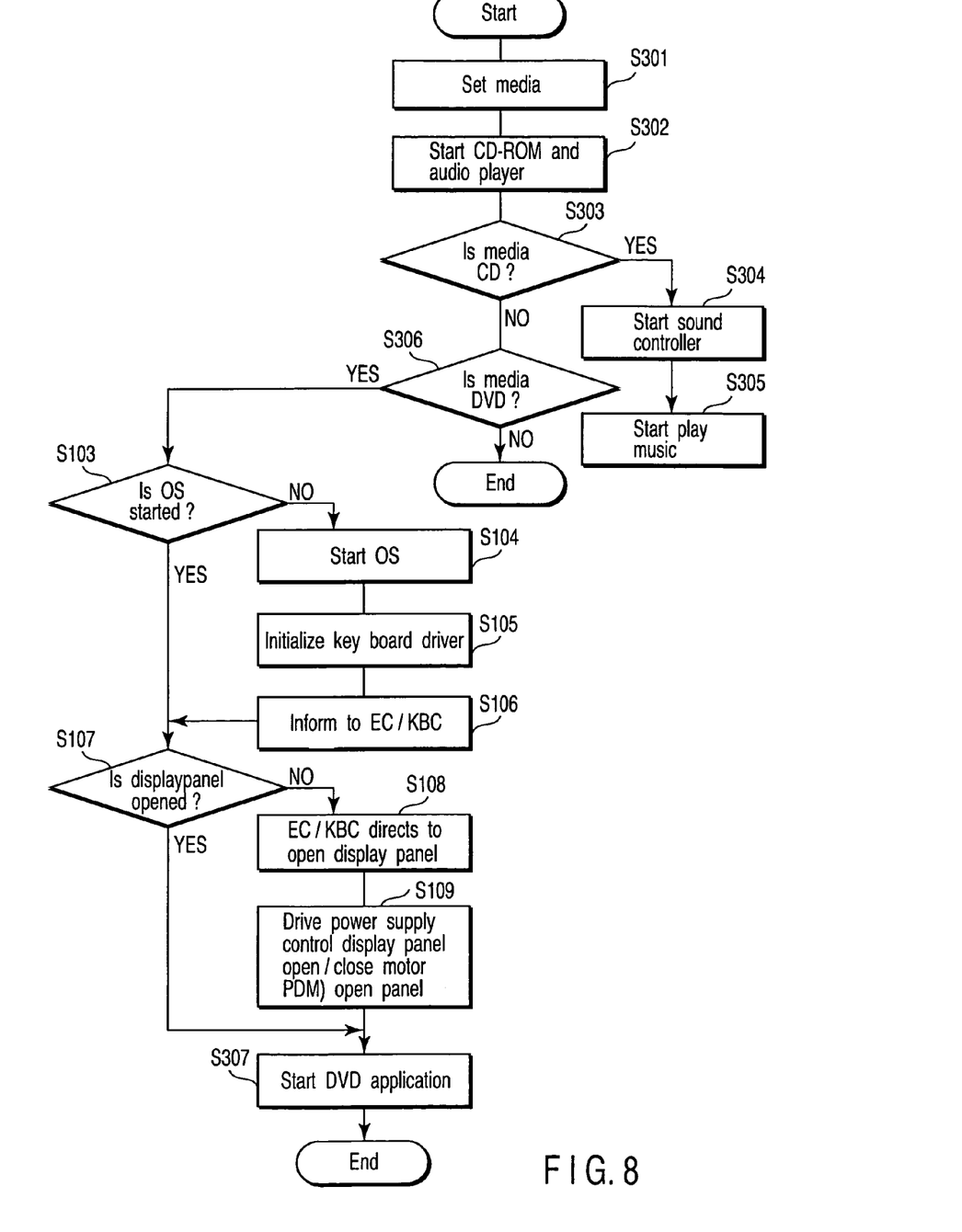
FIG. 8 is a flow chart showing operation when starting of playing media loaded into CD-ROM/DVD drive is directed.

First, an operation when receiving play start instruction of the media (for instance, DVD) mounted on the CD-ROM/DVD drive 209 will be explained referring to FIG. 8.

CD-ROM and Audio player turns on (step S302), when a disk is mounted on the CD-ROM/DVD drive 209 (step S301). When media mounted on the CD-ROM/DVD drive 209 is CD, the sound controller 223 turns on (step S304) to start playing music (step S305).

In step S303, the controller I/O 207 judges whether the media is DVD (step S306), when the media is not CD (NO in step S303), and ends the operation when media is not DVD. In step S306, if the controller I/O 207 judges that the media is DVD (YES in step S306), the procedures similar to step S104 to step S109 are performed shown in FIG. 6, and the EC/KBC 211 starts the DVD application (step S307).

Figure 9:
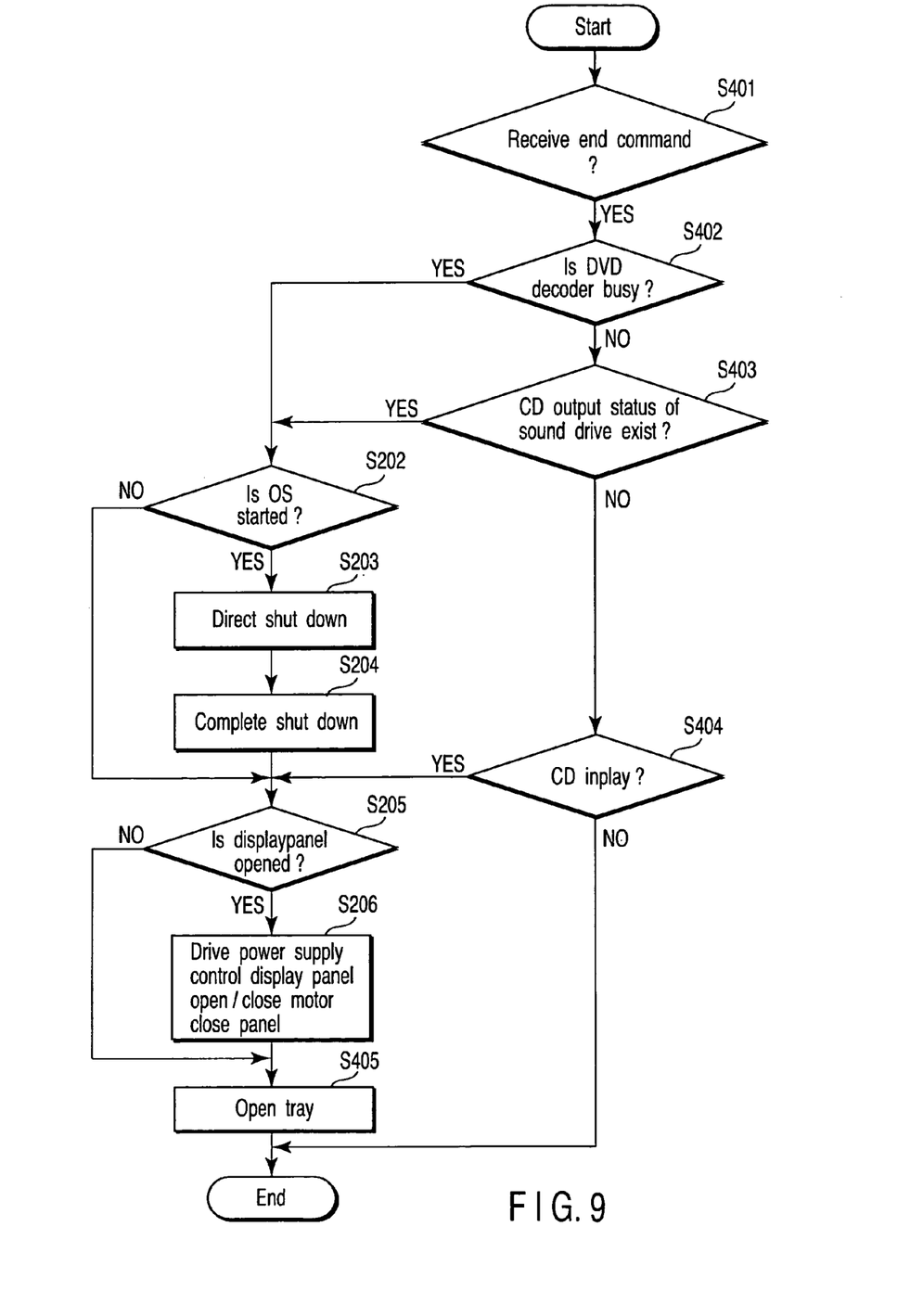
FIG. 9 is a flow chart showing operation when termination of playing media loaded into CD-ROM/DVD drive is directed.

Next, the operation when there is a playing end instruction on media loaded into CD-ROM/DVD drive 209 is explained referring to FIG. 9.

The EC/KBC 211 judges whether the DVD decoder is busy (step S402), when receiving an end instruction (step S401). If the DVD decoder is not busy (NO in step S402), the EC/KBC 211 judges whether there is CD output status of the sound driver 223 (step S403). In step S403, the EC/KBC211 judges whether the CD is in play (step S404), when there is no CD output status (NO in step S403).

When the DVD decoder is busy in step S402 (YES in step S402), or when there is CD output status in step S403 (YES in step S403), the EC/KBC211 confirms whether the OS is activated (step S202). If the OS is activated, the EC/KBC211 directs the shutdown of OS and shutdown the OS (step S203 and S204).

On the other hand, when the OS is shutdown (NO in step S202), or when the CD is in play (YES in step S404), If the panel is open (YES in step S205), the EC/KBC211 directs the power supply controller 213 to close the display unit 12. The power supply controller 213 supplies driving power supply to close the panel to the panel open/close drive motor (PDM) 240 according to the close instruction from the EC/KBC211, and close the display unit 12 (step S206). And, the media can be taken out by opening the tray (step S405). Since the media is not played when CD is not in play in step S404, procedure end as it is.

Figure 10A:
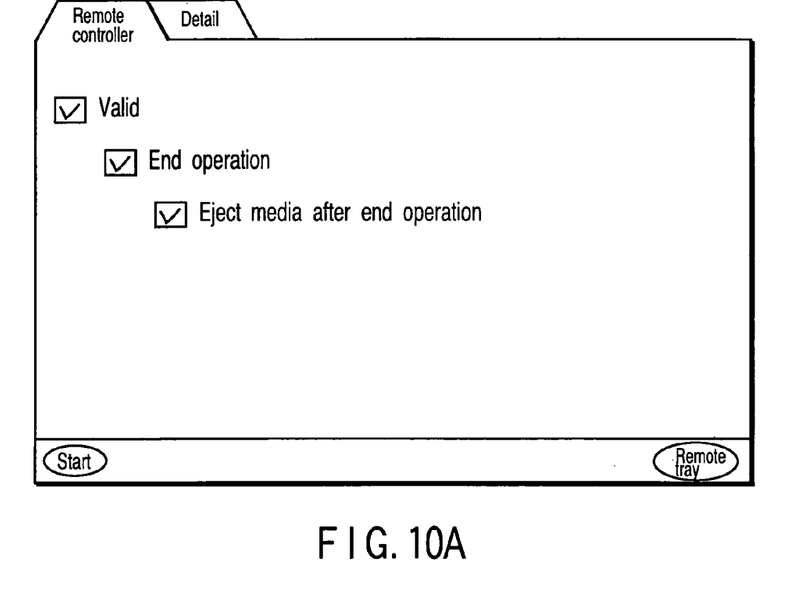
FIG. 10A and FIG. 10B are figures showing example of setting screen when adjusting the panel open/close speed.
Figure 10B:
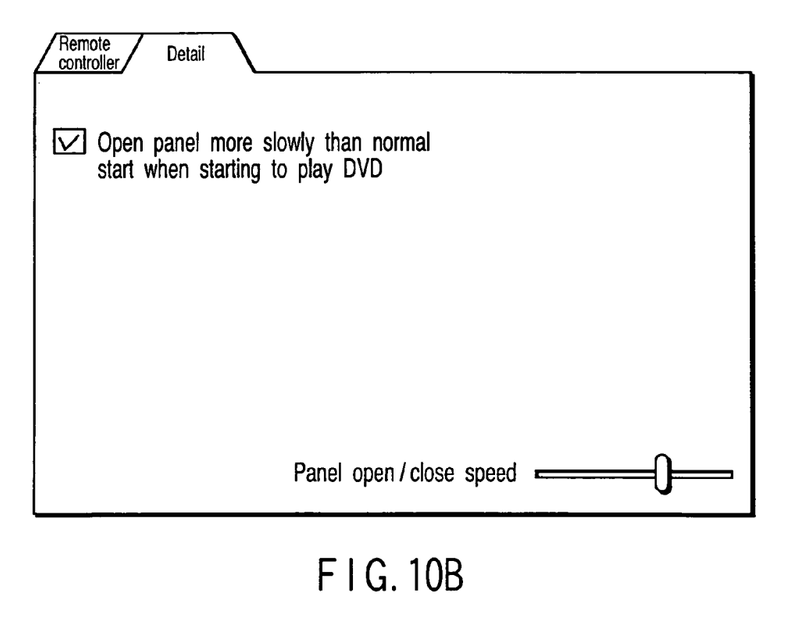

Further, with respect to the above-described instructions, the display unit 12 can be controlled to be opened/closed at an optimum timing or speed in accordance with the contents of each instruction. For example, it is possible to control the display unit 12 to be opened/closed and to control the display of the main display 121 stored in the display unit 12 in synchronous with the startup processing time of the driver, application program or the like, for example. At this time, it is also possible to set the opening speed or closing speed for each startup processing. For example, the time of open of the display unit 12 may be set to (OS start direct time+OS start time) at mere power on, and when playing DVD, the time of open of the display unit 12 may be set to a time of which starting time of the DVD application is added thereto. The setting can be made by the button operation on the main display 121. For example, when remote control tray button 121a shown in FIG. 1 is clicked, the screen shown in FIG. 10A is displayed and it is possible to set whether the remote controller can be used. Then, whether media is ejected can be selected as an end operation after end of operation. Moreover, as show in FIG. 10B, as a detailed setting of the remote controller, the user can set the panel open/close speed.

In addition, as the above-described remote operating means, it is possible to apply a wireless LAN, BlueTooth, a wireless telephone line, a wired telephone line or any other remote operating means as well as infrared-ray communication.

As has been described above in detail, according to the embodiments of the present invention, a remote drive control function for a display case is provided in an information processing apparatus having an openable display case provided on a main body thereof, thereby making it possible to improve functional extension and usability.

The following inventions can be excerpted from the above-described embodiments. Incidentally, the following inventions may be applied independently or may be applied in combination as required.

The present invention is not limited to the above-described embodiments. Various modifications can occur at its embodying stage without departing from the scope of the invention. Further, the inventions at various stages are included in the above-described embodiments, and various inventions can be excerpted according to a proper combination in a plurality of disclosed constituent elements.

In addition, for example, even if some of all the constituent elements shown in the embodiments are deleted, in the case where the problems described in the Brief Summary of the Invention section can be solved, and advantageous effect described in the Advantageous Effect of the Invention section can be achieved, the configuration can be excerpted after these constituent elements have been deleted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a display case provided on a main body of the information processing apparatus;
a driving mechanism which opens or closes the display case on the main body; and
means for remotely controlling operations of the driving mechanism via an embedded controller/keyboard controller IC,
wherein the driving mechanism opens the display case when a predetermined device of the information processing apparatus starts a predetermined operation.

2. The information processing apparatus according to claim 1, wherein the driving mechanism opens the display case in synchronous with a startup timing of a program in accordance with operation of the means for remotely controlling the driving mechanism.

3. The information processing apparatus according to claim 1, wherein the means for remotely controlling the driving controls the driving mechanism via one of a wireless LAN, BlueTooth, an infrared-ray communication, and a telephone line.

4. The information processing apparatus according to claim 1, further comprising means for controlling display of a display device provided in the display case associated with operation of the driving mechanism.

5. The information processing apparatus according to claim 1, wherein the driving mechanism opens and closes the display device with a speed set by an instruction from a user.

* * * * *